United States Patent [19]

Dietzsch et al.

[11] Patent Number: 5,136,481
[45] Date of Patent: Aug. 4, 1992

[54] MOTOR VEHICLE LAMP

[75] Inventors: Werner Dietzsch, Oldenburg; Werner Kohl, Bremen; Peter Metzger, Bad Lippspringe; Horst-Peter Meyer, Bremen, all of Fed. Rep. of Germany

[73] Assignee: Hella KG Hueck & Co., Lippstadt, Fed. Rep. of Germany

[21] Appl. No.: 727,927

[22] Filed: Jul. 10, 1991

[30] Foreign Application Priority Data

Jul. 14, 1990 [DE] Fed. Rep. of Germany ....... 4022480

[51] Int. Cl.5 .............................................. B60Q 1/00
[52] U.S. Cl. ...................................... 362/61; 362/62; 362/363; 362/376
[58] Field of Search ................... 362/61, 62, 363, 376, 362/377, 378, 101; 244/1 A

[56] References Cited

U.S. PATENT DOCUMENTS

| | | | |
|---|---|---|---|
| 1,943,609 | 1/1934 | Hyatt | 362/62 X |
| 2,121,783 | 7/1938 | Breckenridge | 362/311 |
| 3,428,270 | 2/1969 | Knight et al. | 244/1 A |
| 3,619,597 | 11/1971 | Adler, Jr. | 362/227 |
| 3,735,115 | 5/1973 | Adler, Jr. | 362/265 |
| 4,382,049 | 5/1983 | Hofmeister et al. | 244/1 A X |

Primary Examiner—Stephen F. Husar
Attorney, Agent, or Firm—Griffin, Branigan & Butler

[57] ABSTRACT

A motor-vehicle lamp having a light-transmissive shield (3) which is attached to a grounding plate (4) by a holding device (8) and which defines an opening (6) suitable for water removal includes an electrically conductive pin (1) for protecting the motor-vehicle lamp from destruction due to a lightning strike, the pin having a first end extending into the opening (6) and a second end making electrically-conductive contact with an electrical ground (10, 10') of the motor vehicle.

14 Claims, 1 Drawing Sheet

MOTOR VEHICLE LAMP

BACKGROUND OF THE INVENTION

This invention concerns a motor-vehicle lamp which is attached to a grounding plate via a holding device and whose light-transmissive shield defines an opening suitable for removal, or drainage, of water.

"Motor vehicles" as used here particularly refers to aircraft in which such lamps often represent a substantial safety element because they, in conjunction with a flashing device, hinder collisions between aircraft or collisions of aircraft with birds.

Such a motor-vehicle lamp must be provided with a means for removing, or draining, water, preferably an opening in a light-transmissive shield of the motor-vehicle lamp, because quickly changing temperature and pressure relationships (for example upon the landing of an aircraft) condenses moisture in an interior space of the motor-vehicle lamp. This however leads to an increased danger of the motor-vehicle lamp being destroyed from a lightning strike because a lightning bolt can strike into the opening and explosively destroy the motor-vehicle lamp. Also, mounting a removable seal, for removal of the water, in the motor-vehicle lamp provides no remedy with regard to lightning strike security A differential of electrical potential between the light-transmissive shield and the seal seated in the opening of the light-transmissive shield offers lightning no resistance against a strike in this sealed opening of the light-transmissive shield. An available seal, which is used as a closure of an opening in a light-transmissive shield, in the case of a lightning strike, is to be viewed as though there were no seal.

The purpose of this invention is to provide a motor-vehicle lamp which is protected from destruction through lightning strikes in a highly uncomplicated and cost effective manner.

SUMMARY OF THE INVENTION

According to principles of this invention, an electrically conductive pin is provided for a motor-vehicle lamp whose first end extends through an opening of a light-transmissive shield of the lamp and whose second end is in electrically-conductive contact with a motor-vehicle electrical ground.

In this manner the inventive motor-vehicle lamp has, relative to known lamps, the advantage that a lightning-rod acting device is provided which effectively protects the motor-vehicle lamp, that is the light-transmissive shield and a light source located in the interior of the lamp, from lightning strikes.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF A PREFERRED EMBODIMENT

Figure 2:
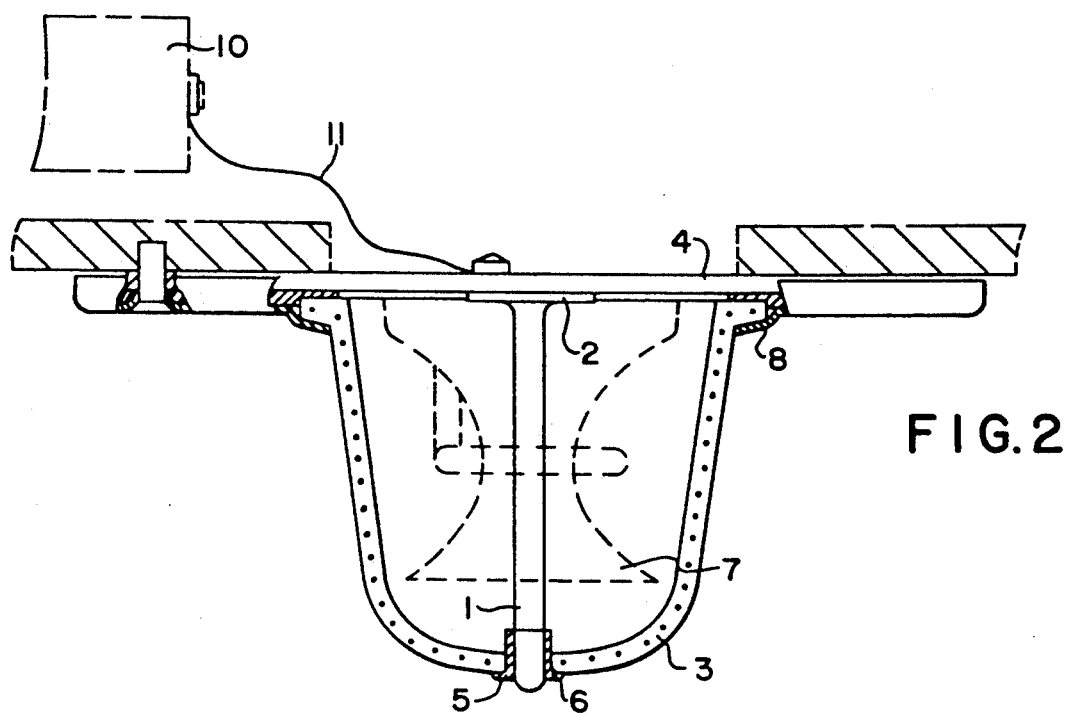
FIG. 2 is a side, partially cross-sectional, view of a similar motor-vehicle lamp of this invention which is mounted on an outer surface which is not electrically conductive.

The inventive motor-vehicle lamps represented in the drawings find use as warning lamps in aircraft.

A dome-shaped light-transmissive shield 3 is attached to a grounding plate 4 by a tentering, or stretching, frame (tenter) serving as a holding device 8. An opening 6, serving for water drainage, or removal, in the light-transmissive shield 3 is passed through by a first end of an electrically-conductive pin 1. An approximately uniform cross section of the pin 1 does not completely fill the opening 6 in the light-transmissive shield 3. An elastomeric seal 5 is mounted in a space between the pin 1 and the opening 6 which protects an interior space of the motor-vehicle lamp from intrusion by rain water and contaminants and which is removable for discharge, or drainage, of condensed water from the lamp interior through the opening 6.

Another end, or second end, of the pin 1 is constructed as a flange 2 which is riveted, or otherwise fastened, to the grounding plate 4.

Arranged about the pin 1 is a torus-shaped light source 7, preferably including a flash lamp. A controlling apparatus, or circuit, 9 is provided for the light source 7 on the other side of the grounding plate 4.

Figure 1:
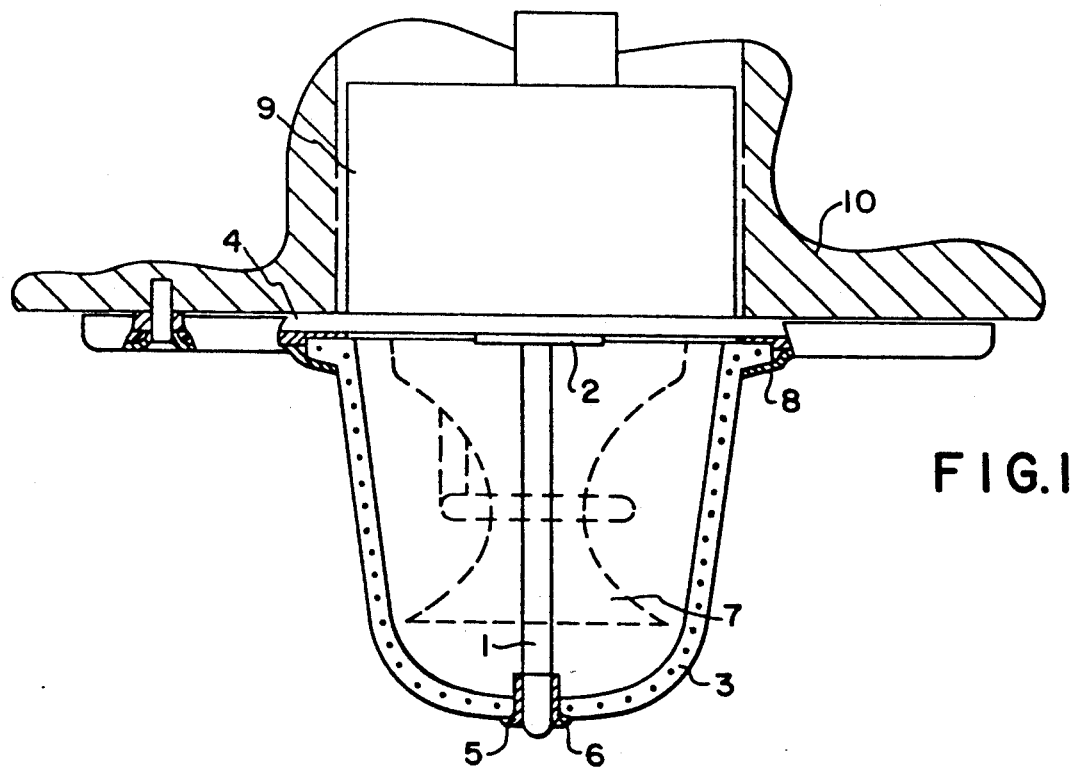
FIG. 1 is a side, partially cross-sectional, view of a motor-vehicle lamp according to this invention in which a grounding plate is mounted on an electrically conductive motor-vehicle outer surface.

In the embodiment of a motor-vehicle lamp of FIG. 1, the grounding plate 4 is directly screwed to the motor-vehicle ground (electrical ground) 10 and a large area of the surface of the grounding plate 4 is in electrically-conductive contact with the motor-vehicle ground.

The embodiment represented in FIG. 2 shows a motor-vehicle lamp which is screwed to electrically non-conducting parts of a motor-vehicle outer surface. An electrical coupling of the grounding plate 4 to the motor-vehicle ground 10', in this case a framework of the aircraft, is provided via a grounding band, or ribbon, 11.

Operation of the lightning-protective apparatus within the inventive motor-vehicle lamp is described as follows with the aid of the embodiment represented in FIG. 1.

Electrical charges within the atmosphere discharge not only between clouds and earth, but also often lead to electrical short circuits between various clouds. Because the outer surfaces of aircraft are generally much more conductive than surrounding air, aircraft are often targets of lightning strikes, with lightning prefering to flow into outwardly-extending parts of the aircrafts' outer surfaces, then to aircraft grounds and leaving the aircraft at other locations.

Particularly outer lights of aircraft are endangered by lightning strikes, particularly when they have openings in light-transmissive shields and when they have electrically conductive elements (for example the light source) mounted in lamp interiors.

In the inventive motor-vehicle lamp represented in FIG. 1, lightning preferably strikes in the pin 1 extending beyond an outer surface of the light-transmissive shield 3 rather than in the light source 7. The electrical charge flows over the cross section of the pin 1 and over the large-area flange 2 to the grounding plate 4 and from there via the whole surface of the grounding plate 4 to the aircraft ground 10. The lightning energy is in this manner led past the light-transmissive shield and the light source 7. In this manner, the entire lamp is protected from destruction.

By use of a tentering frame as a holding device for the light-transmissive shield the lamp has only a small number of releasible attachment elements. In this manner, for example, only the tentering, or stretching, frame 8, the grounding plate 4, and the motor-vehicle ground are screwed to one another. Because screws are in contact with large-area metallic surfaces only relatively small current densities, or concentrations, flow therethrough upon lightning strikes. The screw attachments are in this manner dependably protected against welding and the lamp itself remains mountable, and dismountable, after lightning strikes.

It is advantageous that the length of the pin is so chosen that the first end thereof extending through the light-transmissive shield, similar to a lightning rod of a building, extends a small distance beyond a level of the outer surface of the light-transmissive shield. In this manner, according to the edge or point effect, it is assured that in case of a lightning strike in the motor-vehicle lamp the lightning energy will be led through the pin.

In order to protect the interior of the lamp from rain or contaminants, which for example are discharged by engines of aircraft, it is practical to close the opening in the light-transmissive shield by an elastomeric seal. In order to make possible the discharge, or drainage, of a motor-vehicle lamp, for example when performing maintenance work, the seal should be easily removable from the opening.

Because of possible great heat development from the light source in the interior of the motor-vehicle lamp as well as because of large applications of low temperatures from outside atmosphere, it is beneficial for the seal to provide a not-temperature-sensitive elastomer material.

In this connection, it is beneficial for the temperature-resistive elastomer seal to be of an electrically conductive elastomer. This is particularly beneficial when the light-transmissive shield, in order to shield electromagnetic radiation created by the light source, for example, is electrically-conductively coated with a metallic oxide layer. The electrically-conductive elastomer seal then covers the space between the pin and an edge defining the open in a manner that the entire outer surface of the motor-vehicle lamp is electrically-conductively protected and a disturbance, for example from sparking apparatus, of the flashing-light source in the interior of the motor-vehicle lamp, is avoided.

In order to make possible a sure transmission of lightning energy to the motor-vehicle ground it is necessary to have good electrical contact between the pin and the grounding plate on the one hand as well as between the grounding plate and the motor vehicle ground on the other hand. One achieves the least possible transmission resistance particularly through large surface connections between the described elements. Therefore it is beneficial that the end of the pin connected with the grounding plate is provided with a flange. It is further beneficial that the flange of the pin is riveted to the grounding plate, certainly for one reason because a durable connection, as is here desired, can be accomplished in a particularly cost effectively as a rivet connection and for another reason because construction parts of a screw connection would be welded together in any case and the screw connection would be in this manner made unreleasable by current flows upon a lightning strike.

Upon a lightning strike, the pin is loaded for a short time with a current of a size in the hundreds of kiloamps. For this reason, the pin material, in addition to having good electrical conducting properties, must also have a good temperature resistance.

For these reasons, the pin is preferably constructed of steel which is nickel plated in order to protect it from corrosion. For this material, according to experience, the minimum cross sectional area must be in a size range of 20 mm$^2$. This value can be theoretically decreased to around 3 mm$^2$ by the use of better conducting materials (for example silver).

In order to maintain best-possible good current and temperature conductive properties along the entire length of the pin, a uniform as possible cross section is appropriately chosen.

The currents which flow through the pin upon a lightning strike flow over the electrically conductive, as-large-as-possible-surface, grounding plate, which is screwed with the motor vehicle ground. By means of these large-surface electrical connections, the current densities are reduced to such an extent that they do not lead to a welding of the screws. A similar benefit results in that the holding device, which couples the light-transmissive shield to the grounding plate, employs a large surface tentering frame. The motor-vehicle lamp in this manner can be, also after a lightning strike, easily mounted as well as dismounted.

Because of important reasons, it is beneficial to construct the grounding plate of aluminum.

This apparatus for protection of the motor-vehicle lamp from lightning strikes also gives satisfactory results however when the motor vehicle lamp is mounted on a non-conductive outer surface of the motor vehicle. In this case, the electrically-conductive coupling over a sufficiently dimensioned grounding band is provided.

To achieve a large-area and all-side light broadcasting, the light-transmissive shield can beneficially be formed as a light dome. Although the light dome extends locally outwardly from the surface level of the motor vehicle, the motor vehicle lamp is protected to a great extent from destruction by a lightning strike by the inventive apparatus.

While the invention has been particularly shown and described with reference to preferred embodiments, it will be understood by those skilled in the art that various changes in form and detail may be made therein without departing from the spirit and scope of the invention.

The embodiments of the invention in which an exclusive property or privilege are claimed or defined as follows:

1. A motor-vehicle lamp having a light-transmissive shield which is coupled to a grounding plate via a holding device and which defines an opening suitable for water removal includes an electrically conductive pin having a first end extending into the opening and a second end making electrically-conductive contact with an electrical ground of the motor vehicle.

2. A motor-vehicle lamp according to claim 1 wherein the pin extends outwardly beyond a level of an outer surface of the light-conductive shield.

3. A motor-vehicle lamp according to claim 1 wherein a space between the pin and an edge of the light-transmissive shield defining the opening is closable by a removable, temperature-resistive, elastomeric seal.

4. A motor-vehicle lamp according to claim 1 wherein the pin is electrically coupled with the grounding plate.

5. A motor-vehicle lamp according to claim 4 wherein the flange of the pin is riveted to the grounding plate.

6. A motor-vehicle lamp according to claim 1 wherein the pin is of nickel coated steel.

7. A motor-vehicle lamp according to claim 1 wherein the pin has an approximately uniform cross sectional area.

8. A motor-vehicle lamp according to claim 7 wherein the cross sectional area of the pin measures at least 3 mm$^2$, preferably around 20 mm$^2$.

9. A motor-vehicle lamp according to claim 1 wherein the pin is in electrically-conductive connection with a motor vehicle ground via a grounding band.

10. A motor-vehicle lamp according to claim 1 wherein the light-transmissive shield is constructed as a light dome.

11. A motor-vehicle lamp according to claim 1 wherein the holding device for the light-transmissive shield is constructed as a tentering frame.

12. A motor-vehicle lamp according to claim 1 wherein the grounding plate is of an electrically conductive material.

13. A motor-vehicle lamp according to claim 12 wherein the grounding plate is of aluminum.

14. A motor-vehicle lamp according to claim 3 wherein the temperature resistive elastomer seal is of an electrically-conductive elastomer.

* * * * *